United States Patent
Ota et al.

(10) Patent No.: US 7,020,377 B2
(45) Date of Patent: Mar. 28, 2006

(54) WIRING BOARD

(75) Inventors: Shogo Ota, Tokyo (JP); Koji Sakata, Tokyo (JP)

(73) Assignee: Shoden Corporation, Tokyo (JP)

( * ) Notice: Subject to any disclaimer, the term of this patent is extended or adjusted under 35 U.S.C. 154(b) by 0 days.

(21) Appl. No.: 10/997,974

(22) Filed: Nov. 29, 2004

(65) Prior Publication Data

US 2006/0024014 A1   Feb. 2, 2006

(30) Foreign Application Priority Data

Jul. 27, 2004   (JP) .............................. 2004-218270

(51) Int. Cl.
*G02B 6/00* (2006.01)
*G02B 6/44* (2006.01)
*H01R 33/945* (2006.01)
*H01R 3/00* (2006.01)

(52) U.S. Cl. ...................... 385/135; 439/100; 439/577; 439/489

(58) Field of Classification Search ................ 439/577, 439/489; 385/100, 135, 101, 147
See application file for complete search history.

(56) References Cited

U.S. PATENT DOCUMENTS

| | | | | |
|---|---|---|---|---|
| 5,394,503 A | * | 2/1995 | Dietz et al. | 385/135 |
| 2002/0159715 A1 | * | 10/2002 | Kimura et al. | 385/75 |
| 2004/0240807 A1 | * | 12/2004 | Frohlich et al. | 385/100 |

FOREIGN PATENT DOCUMENTS

| JP | 06-260235 A | 9/1994 |
|---|---|---|
| JP | 2001-145221 A | 5/2001 |

* cited by examiner

*Primary Examiner*—Chandrika Prasad
(74) *Attorney, Agent, or Firm*—Birch, Stewart, Kolasch & Birch, LLP

(57) ABSTRACT

On a wiring board, an optical connection cable is provided in which a wiring light cord and a conducting wire are laid out in parallel. A primary side port and a secondary side port are optically connected for wiring, and are electrically connected to confirm the connection. When both ports are electrically connected, it is possible to confirm that the primary side port and the secondary side port are connected and a circuit is formed.

5 Claims, 5 Drawing Sheets

WIRING BOARD

BACKGROUND OF THE INVENTION

1) Field of the Invention

The present invention relates to a wiring board that forms a communication circuit by selecting a set of primary side ports and a set of secondary side ports from among many primary side and secondary side ports, and connecting the primary side ports and the secondary side ports via an optical connection cable.

2) Description of the Related Art

A patch panel board as an example of a wiring board according to a conventional technique is explained with reference to the accompanying drawings. FIG. 6 is an explanatory diagram of a connector of the patch panel board according to the conventional technique. Many connector units are actually present at the primary side and the secondary side, respectively. However, for the sake of simplicity of explanation, only connector units to be connected are shown at the primary side and the secondary side, respectively.

As shown in FIG. 6, the connector according to the conventional technique has a primary side light cord 1, a secondary side light cord 2, an optical connection cable 3, a primary side connector unit 4, and a secondary side connector unit 5.

A primary side optical connector 1a is formed at a terminal of the primary side light cord 1. This primary side optical connector 1a is accommodated in the primary side connector unit 4. A secondary side optical connector 2a is formed at a terminal of the secondary side light cord 2. This secondary side optical connector 2a is accommodated in the secondary side connector unit 5. A primary side optical connector 3a and a secondary side optical connector 3b are formed at both side terminals of the optical connection cable 3.

As shown in FIG. 6, when the primary side optical connector 3a of the optical connection cable 3 is accommodated in the primary side connector unit 4, the primary side optical connector 1a and the primary side optical connector 3a are disposed oppositely and are optically connected to each other.

When the secondary side optical connector 3b of the optical connection cable 3 is accommodated in the secondary side connector unit 5, the secondary side optical connector 2a and the secondary side optical connector 3b are disposed oppositely and are optically connected to each other.

By this arrangement, the primary side light cord 1 and the secondary side light cord 2 are connected together via the optical connection cable 3.

According to this connection of the patch panel board, an operator first searches a primary side connector unit and a secondary side connector unit of corresponding ports with reference to a work instruction manual (a port connection table), and inserts a primary side optical connector and a secondary side optical connector of an optical connection cable. Then, the operator checks whether the connection is correct, using actual optical data or the like. After the confirmation, the operator enters a port management table of the primary side port and the secondary side port connected, respectively. At each port of the primary side and the secondary side, address information is displayed using a card (write system), or display of address information is omitted.

According to this conventional technique, there are (1) a possibility of a connection error, and (2) a possibility of a description error (such as a writing error, and an erroneous omission of description) by the operator, which are management errors.

In order to decrease such management errors, various measures are taken. A conventional technique to decrease these errors is explained with reference to the drawings. FIG. 7 is an explanatory diagram of a connector of a patch panel board according to another conventional technique. This patch panel board has a primary side inductive LED (light-emitting diode) 6a, a secondary side inductive LED 6b, a display driver 7, a connection setting data storage 8, and a setting display section 9, in addition to the parts in the conventional technique shown in FIG. 6.

According to this patch panel board, connection setting data to indicate a primary side connector and a secondary side connector to be connected can be input. When the operator operates the setting display section (specifically, a personal computer) 9 to input connection setting data, a display section (specifically a display of the personal computer) of the setting display section 9 displays the connection setting data. This connection setting data is provisionally stored in the connection setting data storage 8, and is output to the display driver 7. When the display driver 7 outputs a primary side LED control signal and a secondary side LED control signal as electric signals necessary for light emission to the set primary side inductive LED 6a and the set secondary side inductive LED 6b, respectively, one primary side inductive LED 6a and one secondary side inductive LED 6b that are selected from among many LEDs are lit up. The primary side connector unit 4 to be connected is selected by the light-emitting primary side inductive LED 6a, and the secondary side connector unit 5 to be connected is selected by the light-emitting secondary side inductive LED 6b.

According to this conventional technique, there is an advantage that a port to be connected can be selected easily, and the number of connection errors can be decreased.

The conventional techniques are explained above with reference to FIG. 6 and FIG. 7. There is another conventional technique of a patch panel board as described in a Patent Literature 1 (Japanese Patent Application Laid-Open No. 2001-145221 (Paragraph No. 0012 to 0030, FIGS. 1 to 4), Title of the invention: Terminal Identification Cable). According to this conventional technique, an optical fiber is disposed around an external periphery of a cable that connects a device, along a total length of the cable. Light is irradiated at one end of the optical fiber to emit light from the other end of this optical fiber, thereby identifying the cable in an improved manner. This method prevents wiring errors and can improve work efficiency.

There is still another conventional technique of a patch panel board as described in a Patent Literature 2 (Japanese Patent Application Laid-Open No. H6-260235 (Paragraph No. 0017 and 0018, FIG. 2), Title of the invention: Wiring Connecting Device and Wiring Connecting Method). This conventional technique applies to a metal cable instead of a light cord. A connection position is informed using an LED like the conventional technique as explained with reference to FIG. 7.

In order to avoid the above errors in managing the patch panel board, there is a demand for a patch panel board that has (1) a connection error preventing function of accurately connecting between targeted ports, and (2) a connection error managing function of accurately managing the connected ports.

However, the patch panel board according to the conventional technique as shown in FIG. 7 does not have the above functions. According to the patch panel board shown in FIG. 7, the primary side inductive LED and the secondary side inductive LED are fitted to the primary side connector unit and the secondary side connector unit, respectively. The connection error preventing function (1) is achieved by informing by emitting light from the port to be connected. However, after the connection, the conventional management method is applied. (In other words, after the light cord is inserted, the operator confirms whether the ports are actually connected, and enters the management table.) Thus, this patch panel board does not achieve both the connection error preventing function and the connection error monitoring function. The patch panel board according to the conventional technique described in the Patent Literature 1 does not achieve the both functions either.

According to the conventional technique described in the Patent Literature 2, a connection is confirmed based on induction using an LED display, or by using one line as a connection confirmation line out of six lines. However, this method cannot be easily applied to a patch panel board using a light cord. When an optical connection cable in which light cords of communication lines and a connection confirmation line is used for the connection confirmation, a light cord for connection confirmation, an E/O (electrical to optical) converter, and an O/E (optical to electrical) converter are necessary corresponding to the number of ports, which results in a substantial increase in cost. In the case of the optical connection cable in which plural light cords run, connectors must face each other at accurate positions in the primary side connector unit and the secondary side connector unit. However, connector positions are deviated due to force of the optical connection cable which cannot be easily bent because of the plural light cords. This makes it difficult to successfully carry out optical signal communications, which may possibly lead to a connection error. Since the connectors are correctly connected in the primary side connector unit and the secondary side connector unit, this connector error cannot be easily determined, which may make it difficult to carry out management.

SUMMARY OF THE INVENTION

The present invention has been achieved to solve the above problems. It is an object of the present invention to provide a wiring board that can be provided at low cost, can suppress occurrence of a connection error, and can achieve a connection error preventing function and a connection error monitoring function even when the wiring is based on light cords.

(1) In order to achieve the connection error preventing function, a primary side port and a secondary side port to be connected are informed.

To provide this information, a primary side inductive light emitter for display (such as an LED, a laser diode, or a lamp), and a secondary side inductive light emitter for display (such as an LED, a laser diode, or a lamp) are provided in the primary side port and the secondary side port of the wiring board, respectively. A setting display section (such as a personal computer (hereinafter, a "PC")) selects a set of a primary side port and a secondary side port to be connected together. A display section displays the setting, and lights up a primary side inductive light emitter and a secondary side inductive light emitter in the primary side port and the secondary side port, respectively.

(2) In order to achieve the connection error monitoring function, it is confirmed whether the ports are actually connected.

To carry out this confirmation, a conducting wire (a copper wire or other metal wire) is placed inside a primary side connector unit, an optical connection code, and a secondary side connector unit, respectively. When the optical connection code is inserted into the primary side connector unit and the secondary side connector unit, the conducting wires are electrically connected to each other. Based on this electric connection, the connection between the ports is confirmed by loop detection or by data transmission/reception. When the connection between the set ports is confirmed, the primary side inductive light emitter and the secondary side inductive light emitter (both in green) in the corresponding ports are lit out, and data indicating the completion of the connection is sent to the setting display section. When the connection is wrong, or when the ports are not connected yet, the primary side inductive light emitter and the secondary side inductive light emitter (both in green) in the corresponding ports are flickered again after a lapse of a few minutes.

A first aspect of the present invention provides a wiring board on which a plurality of primary side light cords and a plurality of secondary side light cords drawn out from a primary side line wire and a secondary side line wire, respectively, are wired, the wiring board including: a primary side optical connector that is provided at a terminal of each primary side light cord, a secondary side optical connector that is provided at a terminal of each secondary side light cord; a primary side connector that is provided at a terminal of a primary side conducting wire; a secondary side connector that is provided at a terminal of a secondary side conducting wire; a primary side connector unit that accommodates the primary side optical connectors and the primary side connector; a secondary side connector unit that accommodates the secondary side optical connectors and the secondary side connector; a primary side inductive light emitter that is disposed on the periphery of the primary side connector unit; a secondary side inductive light emitter that is disposed on the periphery of the secondary side connector unit; an optical connection cable in which a wiring light cord and a conducting wire are laid out in parallel, and which has a primary side common connector and a secondary side common connector, each having an optical connector and an electric connector, provided at both ends, respectively; a connection setting data storage that stores connection setting data indicating a set of connectors to be connected; a display driver that reads the connection setting data from the connection setting data storage, and makes a set of the primary side inductive light emitter and the secondary side inductive light emitter emit light; and a connection confirmation section that is connected to the primary side conducting wire and the secondary side conducting wire, and outputs a light extinction signal to turn off the primary side inductive light emitter and the secondary side inductive light emitter to the display driver, when a loop detection or a signal communication is confirmed that indicates that the set primary side connector and the set secondary side connector are connected to the conducting wire.

A second aspect of the present invention provides the wiring board according to the first aspect, wherein when the loop detection or the signal communication based on a circuit formed by the set primary side connector, the set secondary side connector, and the conducting wire is not confirmed, the connection confirmation section outputs a flicker signal to make the primary side inductive light emitter and the secondary side inductive light emitter flicker, to the display driver.

A third aspect of the present invention provides the wiring board according to the second aspect, wherein the connection confirmation section has an informing section that informs that a connection is not completed, by sounding an alarm by a buzzer or in voice using a speaker.

A fourth aspect of the present invention provides the wiring board according to any one of the first to the third aspects, further including: a setting display section that transmits connection setting data; and a communication section that receives the connection setting data, and transmits the connection setting data to the connection setting data storage.

A fifth aspect of the present invention provides the wiring board according to the fourth aspect, wherein a network is present between the setting display section and the communication section.

DETAILED DESCRIPTIONS

Figure 1:
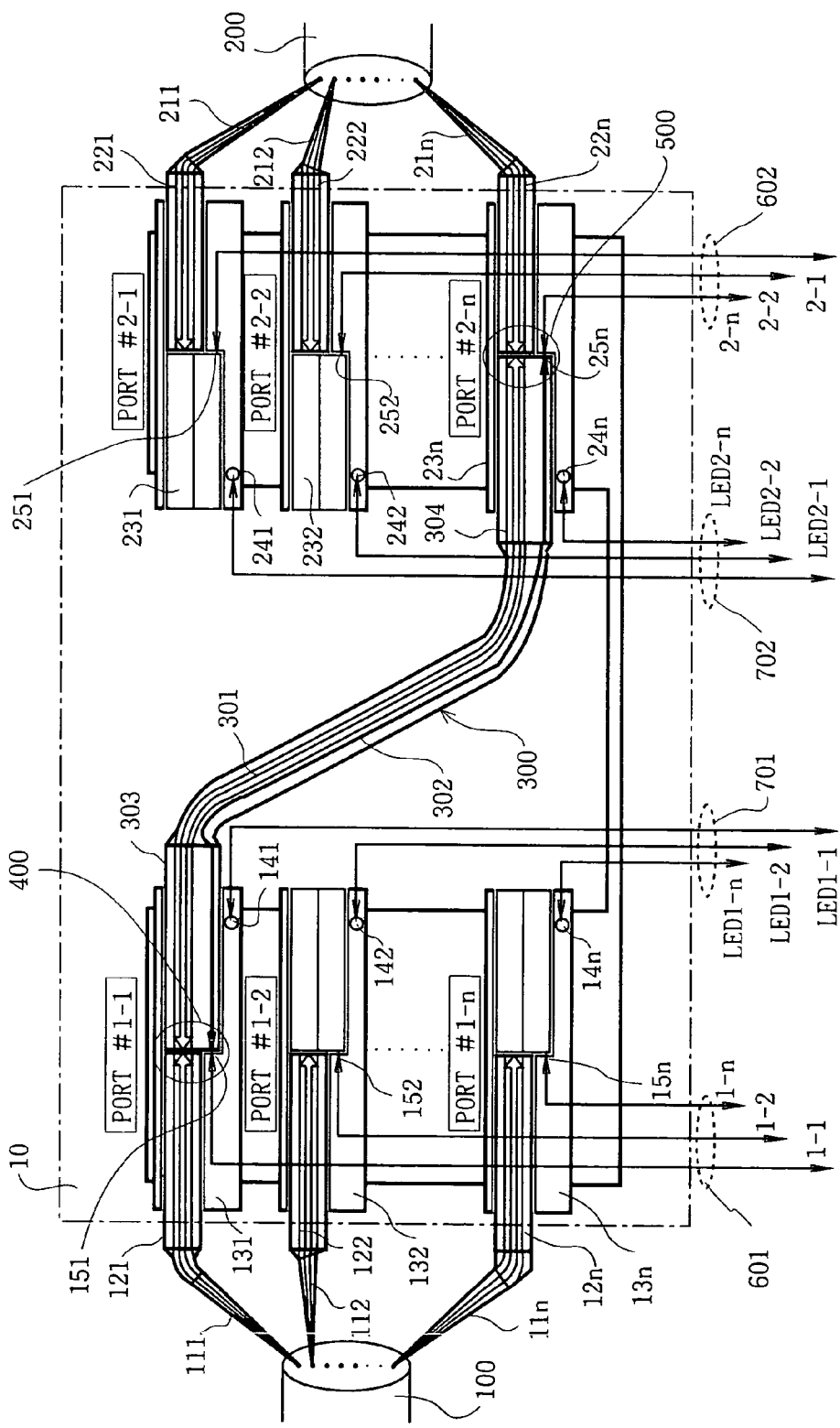
FIG. 1 is a configuration diagram of a part of a wiring board according to an embodiment of the present invention.
Figure 2:
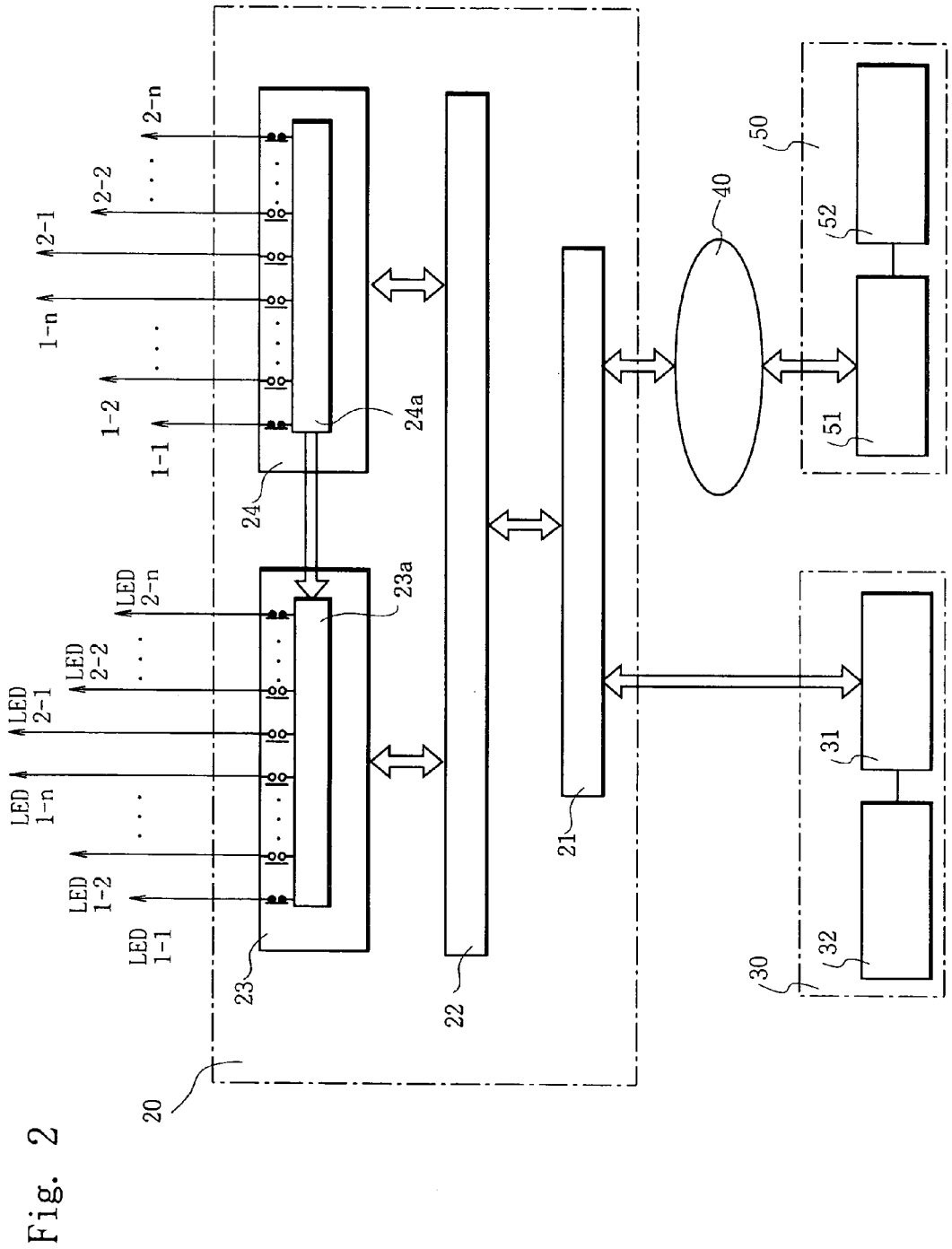
FIG. 2 is a configuration diagram of a part of the wiring board according to the embodiment of the present invention.

Exemplary embodiments of a wiring board according to the present invention will be explained below with reference to the accompanying drawings. FIG. 1 and FIG. 2 are configuration diagrams of a part of a wiring board according to an embodiment of the present invention. The parts shown in FIG. 1 and FIG. 2 combined together form a wiring board. This wiring board covers a wiring board such as a patch panel.

As shown in FIG. 1 and FIG. 2, the wiring board has at least a panel board 10 and a controller 20. The wiring board requires a setting display section 30 to carry out a setting as described later. The setting display section 30 is usually separated, and is connected only when the setting is carried out.

The wiring board can incorporate the setting display section 30. In this case, the wiring board includes the panel board 10, the controller 20, and the setting display section 30.

A setting display section 50 can be also connected via a network 40. Although not shown, the wiring board can have only the setting display section 30, or only the setting display section 50. Alternatively, the wiring board can have both the setting display section 30 and the setting display section 50 as shown in FIG. 2.

The panel board 10 has, at the primary side, a line wire 100, n primary side light cords 111 to 11n, n primary side optical connectors 121 to 12n, n primary side connector units 131 to 13n, n primary side inductive LEDs 141 to 14n, and n primary side connectors 151 to 15n.

The n primary side optical connectors 121 to 12n are connected to terminals of the n primary side light cords 111 to 11n, respectively, that are drawn out from the line wire 100. The n primary side optical connectors 121 to 12n are accommodated in the n primary side connector units 131 to 13n, respectively.

The n primary side connector units 131 to 13n accommodate the primary side connectors 151 to 15n, respectively, which are positioned in parallel with the n primary side optical connectors 121 to 12n. Similarly, the primary side inductive LEDs 141 to 14n are fitted to the n primary side connector units 131 to 13n, respectively.

The panel board 10 has, at the secondary side, a line wire 200, n secondary side light cords 211 to 21n, n secondary side optical connectors 221 to 22n, n secondary side connector units 231 to 23n, n secondary side inductive LEDs 241 to 24n, and n secondary side connectors 251 to 25n.

The n secondary side optical connectors 221 to 22n are connected to terminals of the n secondary side light cords 211 to 21n, respectively, that are drawn out from the line wire 200. The n secondary side optical connectors 221 to 22n are accommodated in the n secondary side connector units 231 to 23n, respectively.

The n secondary side connector units 231 to 23n accommodate the secondary side connectors 251 to 25n, respectively, which are positioned in parallel with the n secondary side optical connectors 221 to 22n. Similarly, the secondary side inductive LEDs 241 to 24n are fitted to the n secondary side connector units 231 to 23n, respectively.

An optical connection cable 300 connects between the primary side and the secondary side, and includes a wiring light cord 301, a conducting wire (a metal wire) 302, a primary side common connector 303, and a secondary side common connector 304.

The wiring light cord 301 and the conducting wire 302 are laid out in parallel within the cable. The primary side common connector 303 and the secondary side common connector 304, respectively have an optical connector and an electric connector according to the conducting wire 302.

As shown in FIG. 2, the controller 20 has a communication section 21, a connection setting data storage 22, a display driver 23, and a connection confirmation section 24.

The communication section 21 is directly connected to the setting display sections 30 and 50 via the network 40.

The display driver 23 (more specifically, a display power source 23a) within the controller 20 shown in FIG. 2 is connected to the n primary inductive LEDs 141 to 14n via n primary side LED control lines 701, or is connected to the n secondary inductive LEDs 241 to 24n via n secondary side LED control lines 702, as shown in FIG. 1.

The connection confirmation section 24 (more specifically, a loop detector 24a) within the controller 20 shown in FIG. 2 is connected to the n primary side connectors 151 to 15n via n primary side conducting wires 601, or is connected to the n secondary side connectors 251 to 25n via n secondary side conducting wires 602, as shown in FIG. 1.

The optical connection cable 300 is connected as follows. The primary side common connector of the optical connection cable is connected to one of the primary side connector units at the primary side. The secondary side common connector of the optical connection cable is connected to one of the primary side connector units at the secondary side. For example, as shown in FIG. 1, the primary side common connector 303 of the optical connection cable 300 is connected to the primary side connector unit 131 at the primary side, and the secondary side common connector 304 of the optical connection cable 300 is connected to the secondary side connector unit 23*n* at the secondary side.

Figure 3:
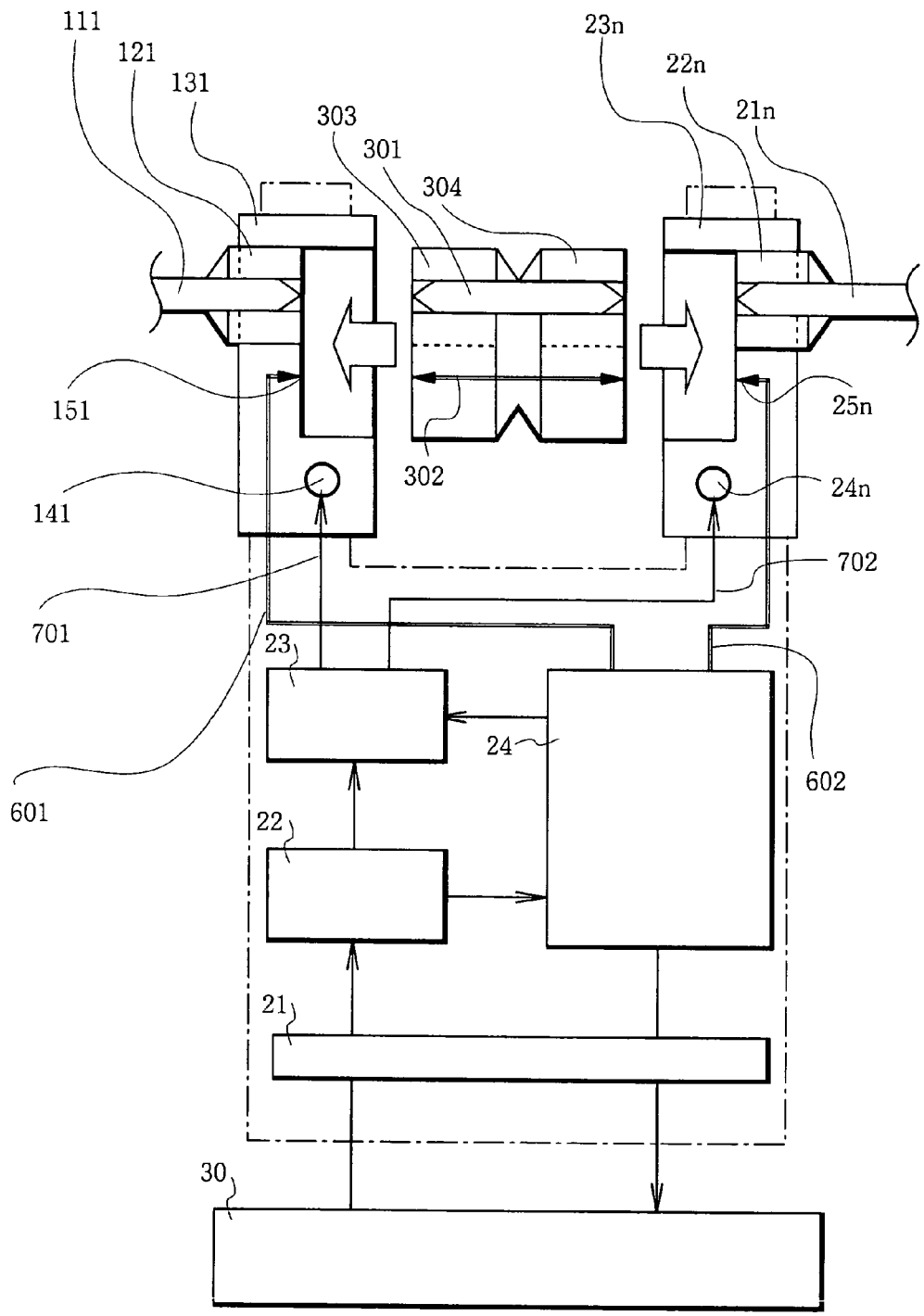
FIG. 3 is an explanatory diagram of the wiring board before wiring.
Figure 4:
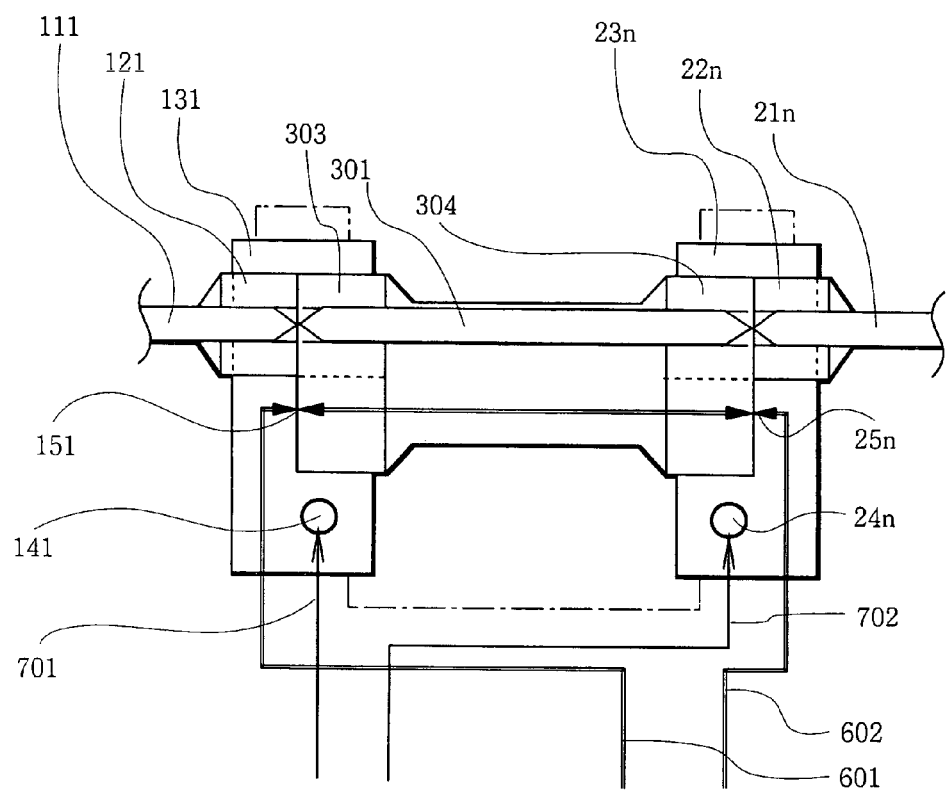
FIG. 4 is an explanatory diagram of the wiring board after the wiring.

The wiring operation is explained next with reference to the accompanying drawings. FIG. 3 is an explanatory diagram of a wiring board before wiring, and FIG. 4 is an explanatory diagram of the wiring board after the wiring. FIG. 3 and FIG. 4 are simplified configuration diagrams of the wiring boards shown in FIG. 1 and FIG. 2. It is assumed that only the setting display section 30 is connected.

Before the wiring, as shown in FIG. 3, the operator operates the setting display section 30 and inputs connection setting information while confirming an enlarged connection display 32 (refer to FIG. 2) at the work site. Then, the setting display section 30 prepares connection setting data. The connection setting data is an instruction data to connect a set of a port #1-1 and a port #2-*n*, for example. The port #1-1 indicates the primary side connector unit 131, and the port #2-*n* indicates the secondary side connector unit 23*n*. In preparing the connection setting data, more data to assign many sets of ports is actually prepared.

The setting display section 30 registers the connection setting data into the incorporated storage, and displays the data in the enlarged connection display 32. The setting display section 30 transmits the connection setting data to the connection setting data storage 22, and the connection setting data storage 22 registers the connection setting data.

The work up to the registration of the connection setting data can be done when wiring is scheduled in the office, and the setting display section 30 can be taken to the work site, and connected to the communication section 21 to display data.

The display driver 23 reads the connection setting data from the connection setting data storage 22. The display driver 23 determines LEDs corresponding to the ports of the connection setting data. An LED 1-1 (the primary side inductive LED 141) and an LED 2-*n* (the secondary side inductive LED 24*n*) correspond to the port #1-1 and the port #2-*n*, respectively. The display driver 23 selects (by turning on a switch) the LED 1-1 (the primary side inductive LED 141) and the LED 2-*n* (the secondary side inductive LED 24*n*), and transmits the primary side LED control signal and the secondary side LED control signal. As a result, the primary side inductive LED 141 and the secondary side inductive LED 24*n* are lit up in green.

The operator connects between the port #1-1 (the primary side connector unit 131) and the port #2-*n* (the secondary side connector unit 23*n*) with the optical connection cable 300, on the panel board 10. After the connection, the state as shown in FIG. 4 is obtained. At this time, since the LED 1-1 (the primary side inductive LED 141) and the LED 2-*n* (the secondary side inductive LED 24*n*) are lit on, the operator does not make error in the connection portions. Based on this connection, the primary side optical connector 121 and the primary side common connector 303 are connected together, and the secondary side optical connector 221 and the secondary side common connector 304 are connected together.

The primary side connector 151 and the conducting wire (a copper wire or other metal wire) 302 are connected together in the port #1-1, and the secondary side connector 25*n* and the conducting wire 302 are connected together in the port #2-*n*.

On the other hand, the connection confirmation section 24 accesses the connection setting data storage 22, and reads the connection setting data. The connection confirmation section 24 determines in advance the set of the port #1-1 and the port #2-*n* as ports to be connected, based on the connection setting data. Therefore, the loop detector 24*a* confirms whether electric loop detection between these ports is possible.

According to the loop detection, after a loop circuit is formed by selecting (by turning on the switch) the port #1-1 and the port #2-*n*, whether a closed circuit is formed (that is, whether a current flows) is confirmed.

In this case, a data transmitter (not shown) can be provided, in place of the loop detector 24*a*, thereby transmitting data to conform the connection. The port #1-1 and the port #2-*n* are selected (by turning on the switch) to form a data transmission circuit. Then, data is transmitted to confirm whether data communication is possible (that is, whether a closed circuit is formed).

When the loop detection or the data transmission is possible, it is determined that the connection is normal, and a light extinction signal to turn off the LED 1-1 (the primary side inductive LED 141) in the port #1-1 and the LED 2-*n* (the secondary side inductive LED 24*n*) in the port #2-*n* is transmitted to the display driver 23. The display driver 23 transmits a primary side LED control signal and a secondary side LED control signal corresponding to the signal, so that the primary side inductive LED 141 and the secondary side inductive LED 24*n* are turned off, respectively.

Result data that indicates a result that the ports are normally connected is transmitted to the setting display section 30 via the communication section 21. The setting display section 30 displays that the connection is completed, which will be explained later.

On the other hand, when the loop detection or the data transmission is not possible even after a lapse of a predetermined time (for example, a few minutes), it is determined that the connection is abnormal. The connection confirmation section 24 transmits a flicker signal to make the LED 1-1 (the primary side inductive LED 141) in the port #1-1 and the LED 2-*n* (the secondary side inductive LED 24*n*) in the port #2-*n* flicker, to the display driver 23. The display driver 23 transmits the primary side LED control signal and the secondary side LED control signal to make the LEDs flicker in the corresponding ports, so that the primary side inductive LED 141 and the secondary side inductive LED 24*n* flicker, respectively.

In this case, an informing section, not shown, incorporated in the connection confirmation section incorporated informs the user about the result of the confirmation (by sounding an alarm by a buzzer or in voice using a speaker).

The connection confirmation section transmits result data indicating that it is not connected, to the setting display section 30 via the communication section 21. The setting display section 30 displays that the connection is not yet completed.

The setting display section 30 receives the result data of the completion or the incompletion from the connection confirmation section 24, and stores this data. The setting display section 30 processes the result data, and displays the connection status in a text format or a graphic format, in the enlarged connection display 32. The setting display section 30 further displays (or prints out) the connection status to inform whether the ports are connected.

The connection wiring is carried out in the manner as described above.

In order to connect many sets of ports using many optical connection cables 300, the above connection operation is repeated sequentially.

Finally, the setting display section 30 stores all the result data transmitted from the connection confirmation section 24. After processing all the result data, the setting display section 30 displays the connection status showing the connection result of the ports in a text format or a graphic format, in the enlarged connection display 32. The setting display section 30 further displays (or prints out) the connection status to inform whether all the ports are connected.

The wiring board according to the present embodiment is as described above.

Figure 5:
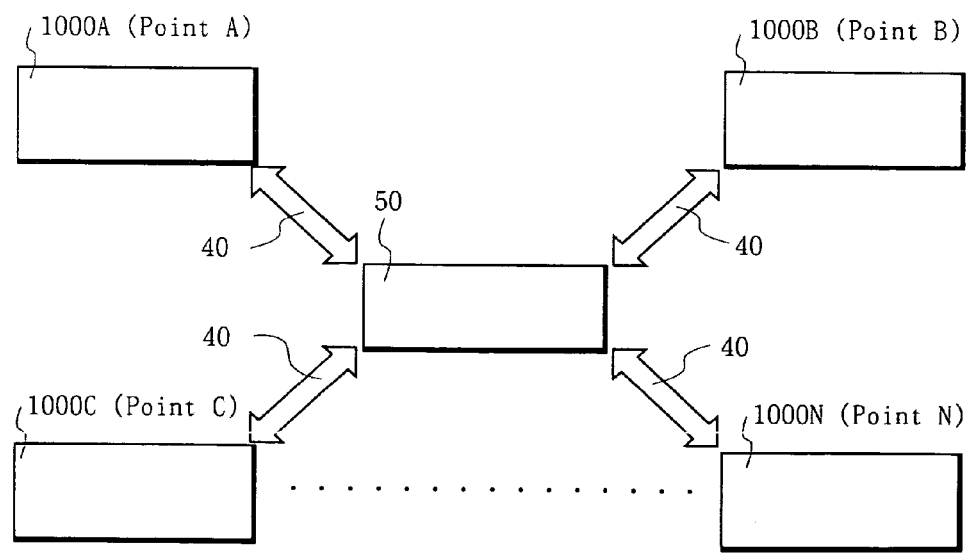
FIG. 5 is an explanatory diagram of a network configuration of the wiring board.
Figure 6:
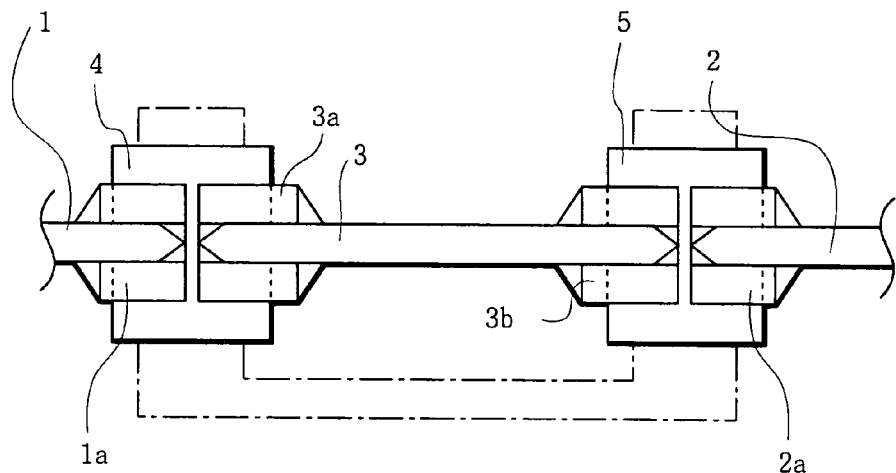
FIG. 6 is an explanatory diagram of a connector of the patch panel board according to a conventional technique.
Figure 7:
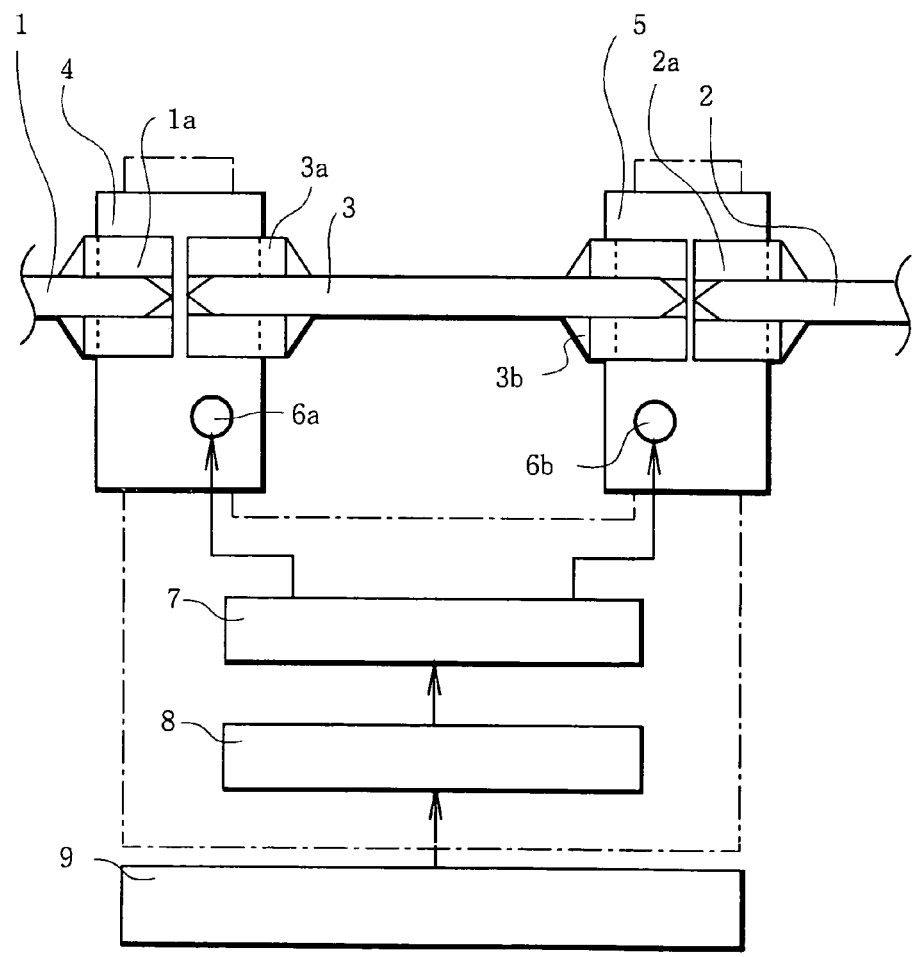
FIG. 7 is an explanatory diagram of a connector of a patch panel board according to another conventional technique.

. When the setting display section 30 such as a personal computer can be externally connected via the network 40, plural wiring boards (at plural points) can be integrally managed. For example, as shown in FIG. 5, the setting display section 50 can integrally monitor a wiring board 1000A at a point A, a wiring board 1000B at a point B, a wiring board 1000C at a point C, and a wiring board N at a point N, via a LAN/WAN (local area network/wide area network) 40 as a specific example of the network.

In this case, the setting display section 50 can understand a circuit that passes through all the points A, B, C, . . . , and N, and can easily confirm the wiring status.

According to the present invention, the setting display section such as a personal computer can automatically prepare a database of connections between the ports, and can avoid connection errors, without involving the operator to make decision, carry out operation, or processing. The personal computer can process the connection setting data as management data. The operator can use the processed data to understand connections (based on a display of a connection list in a text, connection display in graphics, or the like).

The setting display section 50 can carry out an exclusive processing, thereby avoiding a possibility of unnecessary disconnection between the ports.

For an important circuit connection, a logical locking can be carried out. (When a work error occurs in the actual wiring board, this cannot be prevented.)

In order to implement these prevention measures, the possibility of connection error and the possibility of description error can be decreased, thereby minimizing the occurrence of human errors in management.

According to the embodiment shown in FIG. 1, if the provision of a cover for each block of the primary side ports or the secondary side ports makes it difficult to visually confirm the primary side inductive LEDs or the secondary side inductive LEDs, a separate LED (for each block) that is lit based on a logical sum of lighting signals of the LEDs to be covered can be disposed on the surface of the cover to facilitate visual confirmation. With this arrangement, when the LED disposed on the surface of the cover lights up, the operator can recognize that target ports to be connected are present within this block. When the cover is opened, the operator can confirm that the primary side inductive LED and the secondary side inductive LED to be connected are lit on. Therefore, the operator can promptly connect the corresponding ports.

As explained above, according to the present invention, it is possible to provide a wiring board that can be provided at low cost, can suppress occurrence of a connection error, and can achieve the connection error preventing function and the connection error monitoring function even when the wiring is based on light cords.

What is claimed is:

1. A wiring board on which a plurality of primary side light cords and a plurality of secondary side light cords drawn out from a primary side line wire and a secondary side line wire, respectively, are wired, the wiring board comprising:

a primary side optical connector that is provided at a terminal of each primary side light cord;

a secondary side optical connector that is provided at a terminal of each secondary side light cord;

a primary side connector that is provided at a terminal of a primary side conducting wire;

a secondary side connector that is provided at a terminal of a secondary side conducting wire;

a primary side connector unit that accommodates the primary side optical connectors and the primary side connector;

a secondary side connector unit that accommodates the secondary side optical connectors and the secondary side connector;

a primary side inductive light emitter that is disposed on the periphery of the primary side connector unit;

a secondary side inductive light emitter that is disposed on the periphery of the secondary side connector unit;

an optical connection cable in which a wiring light cord and a conducting wire are laid out in parallel, and which has a primary side common connector and a secondary side common connector, each having an optical connector and an electric connector, provided at both ends, respectively;

a connection setting data storage that stores connection setting data indicating a set of connectors to be connected;

a display driver that reads the connection setting data from the connection setting data storage, and makes a set of the primary side inductive light emitter and the secondary side inductive light emitter emit light; and a connection confirmation section that is connected to the primary side conducting wire and the secondary side conducting wire, and outputs a light extinction signal to turn off the primary side inductive light emitter and the secondary side inductive light emitter to the display driver, when a loop detection or a signal communication is confirmed that indicates that the set primary side connector and the set secondary side connector are connected to the conducting wire.

2. The wiring board according to claim 1, wherein when the loop detection or the signal communication based on a circuit formed by the set primary side connector, the set secondary side connector, and the conducting wire is not confirmed, the connection confirmation section outputs a flicker signal to make the primary side inductive light emitter and the secondary side inductive light emitter flicker, to the display driver.

3. The wiring board according to claim 2, wherein the connection confirmation section has an informing section that informs that a connection is not completed, by sounding an alarm by a buzzer or in voice using a speaker.

4. The wiring board according to any one of claims 1 to 3, further comprising:

a setting display section that transmits connection setting data; and a communication section that receives the connection setting data, and transmits the connection setting data to the connection setting data storage.

5. The wiring board according to claim 4, wherein a network is present between the setting display section and the communication section.

* * * * *